United States Patent
Ko et al.

(10) Patent No.: US 8,045,635 B2
(45) Date of Patent: Oct. 25, 2011

(54) INTER-SYMBOL INTERFERENCE CANCELLATION METHOD FOR ORTHOGONAL FREQUENCY DIVISION MULTIPLE ACCESS SYSTEM

(75) Inventors: Seong Yun Ko, Suwon-si (KR); Seong Kyu Song, Seoul (KR); Myeon Kee Youn, Incheon Metropolitan (KR)

(73) Assignee: Samsung Electronics Co., Ltd (KR)

( * ) Notice: Subject to any disclaimer, the term of this patent is extended or adjusted under 35 U.S.C. 154(b) by 637 days.

(21) Appl. No.: 11/844,163

(22) Filed: Aug. 23, 2007

(65) Prior Publication Data
US 2008/0062928 A1    Mar. 13, 2008

(30) Foreign Application Priority Data
Sep. 8, 2006    (KR) .................. 10-2006-0087071

(51) Int. Cl.
*H04L 5/12* (2006.01)
*H04L 23/02* (2006.01)

(52) U.S. Cl. ........... 375/261; 341/94; 714/746; 455/442

(58) Field of Classification Search .......... 375/259–261; 341/50, 94; 714/100, 1, 2, 3, 5, 6, 699, 746, 714/752, 764; 455/403, 422.1, 436, 439, 455/442

See application file for complete search history.

(56) References Cited

U.S. PATENT DOCUMENTS

| | | | |
|---|---|---|---|
| 2002/0191581 A1 | 12/2002 | Isson | |
| 2003/0169824 A1 | 9/2003 | Chayat | |
| 2004/0091055 A1* | 5/2004 | Williams | 375/259 |
| 2004/0202103 A1* | 10/2004 | Suh et al. | 370/208 |
| 2005/0201270 A1* | 9/2005 | Song et al. | 370/208 |
| 2006/0078040 A1* | 4/2006 | Sung et al. | 375/140 |

FOREIGN PATENT DOCUMENTS

| | | |
|---|---|---|
| JP | 2003023409 | 1/2003 |
| KR | 1020040090736 | 10/2004 |
| KR | 1020060050068 | 5/2006 |

OTHER PUBLICATIONS

Platbrood F et al: "Analysis of Coarse Frequency Synchronisation for Hiperlan Type-2", IEEE Vehicular Technology Conference, vol. 2, Sep. 19, 1999.

* cited by examiner

*Primary Examiner* — David C. Payne
*Assistant Examiner* — James M Perez
(74) *Attorney, Agent, or Firm* — The Farrell Law Firm, P.C.

(57) ABSTRACT

An inter-symbol interference cancellation method for an orthogonal frequency division multiple access system is provided. The inter-symbol interference cancellation method includes transmitting, at a base station, an OFDMA symbol having a first half part and a second half part divided in time; receiving, at a mobile station, the OFDMA symbol; and restoring the OFDMA symbol by repeating one of the first half part or the second half part. The ISI cancellation method for an OFDMA communication system of the present invention uses an OFDMA symbol having two identical parts sequentially arranged in time, whereby it is possible to recover a transmitted OFDMA symbol if at least one of the two parts is successfully received.

10 Claims, 1 Drawing Sheet

INTER-SYMBOL INTERFERENCE CANCELLATION METHOD FOR ORTHOGONAL FREQUENCY DIVISION MULTIPLE ACCESS SYSTEM

PRIORITY

This application claims priority to an application entitled "INTER-SYMBOL INTERFERENCE CANCELLATION METHOD FOR ORTHOGONAL FREQUENCY DIVISION MULTIPLE ACCESS SYSTEM" filed in the Korean Intellectual Property Office on Sep. 8, 2006 and assigned Serial No. 2006-87071, the contents of which are incorporated herein by reference.

BACKGROUND OF THE INVENTION

1. Field of the Invention

The present invention relates to an Orthogonal Frequency Division Multiple Access (OFDMA) communication system and, in particular, to an Inter-Symbol Interference (ISI) cancellation technique for an OFDMA communication system.

2. Description of the Related Art

Typically, an OFDMA communication system uses a hard handover. Recently, various soft handover techniques have been proposed for the OFDMA system due to the advantages of the soft handover, such as a diversity gain and an improved Carrier-to-Interference-and-Noise Ratio (CINR) at cell edges in a cellular network of which the frequency reuse factor is 1.

In the cellular system of a frequency reuse factor of 1, the soft handover is performed by assigning symbols and subcarriers in various schemes.

In a first scheme, base stations involved in a handover transmit the same signals through an identical timeslot and identical subcarrier. In this case, a mobile station receives the signals from the two base stations without distinction. The two base stations also transmit the same resource allocation information or mobile application part (MAP), and no reception problem occurs if the mobile terminal receives the resource allocation information from at least one of the two base stations. This provides an effect for reducing frequency shadow areas and increasing reception CINR.

In a second scheme, the two base stations transmit the same signals through the same timeslot and different subcarriers. In this case, the mobile terminal needs to receive the resource allocation information from both base stations. This second scheme has an advantage of improved frequency diversity gain.

In a third scheme, the two base stations transmit the same signals through different timeslots and different subcarriers. In this scheme the mobile terminal also needs to receive the resource allocation information from both base stations for receiving the signals.

In order to recover the received signal through the same or different timeslots and subcarriers, the symbol timing of each base station needs to be synchronized in a range of a Cyclic Prefix (CP) of the OFDMA symbol. If any symbol is delayed longer than the length of the CP, adjacent symbols interfere with each other, i.e. ISI occurs, resulting in reduction of the reception CINR.

Typically, a frame synchronization of the transmit antennas of each base station is supported by a Global Positioning System (GPS). However, different round trip delays (RTD) and multipath effects between the mobile station and the base stations cause delay spread, whereby the symbol synchronization offset may become greater than the CP.

SUMMARY OF THE INVENTION

The present invention has been made in an effort to solve at least the above problems, and it is an object of the present invention to provide an ISI cancellation technique for an OFDMA communication system, especially during a soft handover.

In accordance with an aspect of the present invention, the above and other objects can be accomplished by an inter-symbol interference cancellation method for an orthogonal frequency division multiple access system. The inter-symbol interference cancellation method includes transmitting, at a base station, an OFDMA symbol having a first half part and a second half part divided in time; receiving, at a mobile station, the OFDMA symbol; and restoring the OFDMA symbol by repeating one of the half parts.

In accordance with another aspect of the present invention, the above and other objects can be accomplished by an inter-symbol interference cancellation method for a soft handover-enabled orthogonal frequency division multiple access (OFDMA) system. The inter-symbol interference cancellation method includes generating, at base stations involved in a handover, an OFDMA symbol having a first half part and a second half part divided in time; transmitting the OFDMA symbol after inserting a cyclic prefix; receiving, at a mobile station, the OFDMA symbol; removing the cyclic prefix from the OFDMA symbol; and restoring the OFDMA symbol by repeating one of the half parts.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Preferred embodiments of the present invention are described with reference to the accompanying drawings. The same reference numbers are used throughout the drawings to refer to the same or like parts. Detailed descriptions of well-known functions and structures incorporated herein may be omitted to avoid obscuring the subject matter of the present invention.

Figure 1:
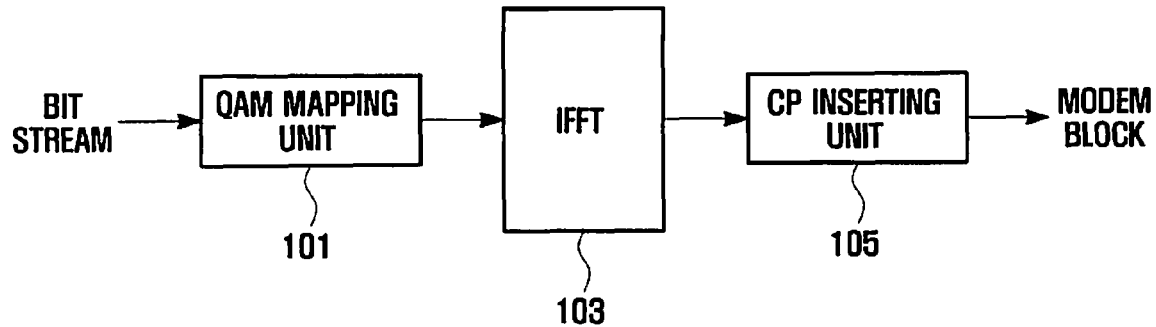
FIG. 1 is a block diagram illustrating a configuration of a base station transmitter of an OFDMA communication system according to the present invention.

FIG. 1 is a block diagram illustrating a configuration of a base station transmitter of an OFDMA communication system according to the present invention.

Referring to FIG. 1, the base station transmitter includes a quadrature amplitude modulation (QAM) mapping unit 101 for modulating an input bit stream, an inverse fast Fourier transformer (IFFT) 103 for outputting an OFDMA symbol on the basis of the signals output from the QAM mapping unit 101, and a CP inserting unit 105 for inserting a CP into the OFDMA symbol.

Figure 2:
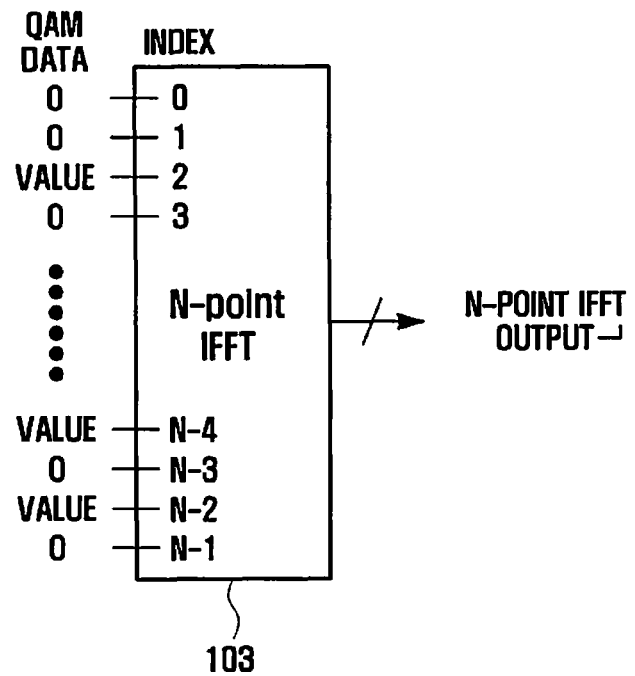
FIG. 2 is a diagram illustrating an IFFT coefficient allocation procedure of an IFFT of the base station transmitter of FIG. 1.

FIG. 2 is a diagram illustrating an IFFT coefficient allocation procedure of the IFFT shown in FIG. 1.

Referring to FIG. 2, the signals output from the QAM mapping unit 101 are input to the IFFT 103 as the IFFT coefficients. The signals are assigned for only even-numbered subcarriers, and the zero-th and odd-numbered subcarriers are assigned 0. The OFDMA symbol generated in this manner is transmitted after the CP is added.

Upon receiving the OFDMA symbol, a mobile station performs symbol synchronization and removes the CP from the OFDMA symbol. After removing the CP, the mobile station performs Fast Fourier Transform on the OFDMA symbol so as to restore the QAM symbols.

Figure 3:
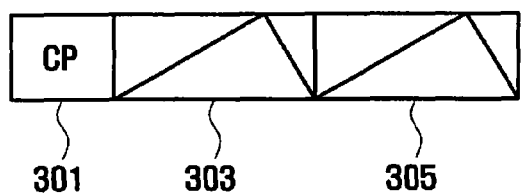
FIG. 3 is a diagram illustrating a structure of an OFDMA symbol according to the present invention.

FIG. 3 is a diagram illustrating a structure of an OFDMA symbol according to the present invention.

As shown in FIG. 3, the OFDMA symbol transmitted by the base station transmitter of FIG. 1 includes a CP 301, a first half part 303, and a second half part 305. The second half part 305 is identical to the first half part 303.

The OFDMA symbol generated according to the present invention has two identical parts sequentially arranged in time, whereby it is possible to recover the transmitted OFDMA symbol if at least one of the first and second half parts is successfully received.

Since the first half part 303 of the OFDMA symbol is likely to be distorted by the ISI, it is preferable to use the second half part 305 of the OFDMA symbol for recovering the transmitted OFDMA symbol.

That is, the transmitted OFDMA symbol is recovered by removing the first half part 303 to cancel the ISI and repeating the second half part 305.

As described above, the ISI cancellation method for an OFDMA communication system of the present invention uses an OFDMA symbol having two identical parts sequentially arranged in time, whereby it is possible to recover a transmitted OFDMA symbol if at least one of the two parts is successfully received.

Also, the ISI cancellation method for an OFDMA communication system of the present invention provides an OFDMA symbol having an ISI tolerant part, which can be restored by the rest of the OFDMA symbol, in addition to a CP, whereby it is possible to cancel the ISI.

Also, the ISI cancellation method for an OFDMA communication system of the present invention enables a seamless soft handover by improving the ISI performance.

Although preferred embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. An inter-symbol interference cancellation method for an Orthogonal Frequency Division Multiple Access (OFDMA) system, comprising:
    transmitting, at a base station, an OFDMA symbol having a first half part and a second half part divided in time;
    receiving, at a mobile station, the OFDMA symbol; and
    restoring the OFDMA symbol by removing one of the first half part and the second half part, and repeating the other of the first half part and the second half part.

2. The inter-symbol interference cancellation method of claim 1, wherein restoring the OFDMA symbol comprises:
    removing the first half part of the OFDMA symbol; and
    repeating the second half part of the OFDMA symbol.

3. The inter-symbol interference cancellation method of claim 1, further comprising inserting a cyclic prefix into the OFDMA symbol before transmission.

4. The inter-symbol interference cancellation method of claim 3, further comprising removing the cyclic prefix before restoring the OFDMA symbol.

5. The inter-symbol interference cancellation method of claim 1, wherein transmitting an OFDMA symbol comprises:
    performing quadrature amplitude modulation on input bit streams for generating a plurality of parallel signals; and
    assigning the parallel signals to even-numbered subcarriers.

6. The inter-symbol interference cancellation method of claim 5, wherein transmitting an OFDMA symbol further comprises assigning 0 to zero-th and odd-numbered subcarriers.

7. An inter-symbol interference cancellation method for a soft handover-enabled Orthogonal Frequency Division Multiple Access (OFDMA) system, comprising:
    generating, at base stations involved in a handover, an OFDMA symbol having a first half part and a second half part divided in time;
    transmitting the OFDMA symbol after inserting a cyclic prefix;
    receiving, at a mobile station, the OFDMA symbol;
    removing the cyclic prefix from the OFDMA symbol; and
    restoring the OFDMA symbol by removing one of the first half part and the second half part, and repeating the other of the first half part and the second half part.

8. The inter-symbol interference cancellation method of claim 7, wherein restoring the OFDMA symbol comprises:
    removing the first half part of the OFDMA symbol; and
    repeating the second half part of the OFDMA symbol.

9. The inter-symbol interference cancellation method of claim 7, wherein generating an OFDMA symbol comprises:
    performing quadrature amplitude modulation on input bit streams for generating a plurality of parallel signals; and
    assigning the parallel signals to even-numbered subcarriers.

10. The inter-symbol interference cancellation method of claim 9, wherein transmitting an OFDMA symbol further comprises assigning 0 to zero-th and odd-numbered subcarriers.

* * * * *